Patented Dec. 11, 1945

2,390,746

UNITED STATES PATENT OFFICE 2,390,746

SOLUBLE SULPHUR PREPARATIONS

Frank E. Stirn, Pearl River, N. Y., assignor to Lederle Laboratories, Inc., New York, N. Y., a corporation of Delaware No Drawing. Application February 19, 1944, Serial No. 523,109

5 Claims. (Cl. 260—125)

This invention relates to a new composition of matter particularly useful in the treatment of dermatological conditions.

I have discovered that when an anhydrous mixture of sulphur, calcium oxide, and a polyhydric alcohol is heated at a temperature within the range of from about 100° C. to 150° C., these materials react together to produce a new composition of matter which has been found to be useful in the treatment of burns and skin diseases such as scabies, shingles, herpes, and the like, which respond to treatment with elemental sulphur. The product is clear, greaseless, penetrating, and not particularly odorous. It may be in the form of a liquid or as a salve or ointment.

When an anhydrous mixture of sulphur, calcium oxide, and a polyhydric alcohol, such as propylene glycol, is slowly heated, an exothermic reaction takes place when the temperature of the reaction mixture is at about 100° C. If the temperature of the reaction mass is brought up slowly to the point at which the exothermic reaction occurs, it is found that the reaction proceeds smoothly, and after an hour or two a product is obtained, in which the lime and sulphur are soluble to give a clear solution. When the reaction mixture is heated more rapidly, the exothermic reaction which starts at about 100° C. may become uncontrollable, and the reaction mixture may overheat, resulting in the formation of mercaptans or other undesirable side reaction products. For this same reason heating the reaction mixture for a substantial period of time at temperatures over about 150° C. is avoided.

The reaction product which is formed during the heating of sulphur and lime in a polyhydric alcohol between 100 and 150° C. has not been definitely established by me as yet. Several possible reaction products can be postulated. It is probable, however, that the reaction involves all three of the components of the reaction mixture since the reaction product of calcium oxide and sulphur alone is insoluble in a polyhydric alcohol. It has also been observed that the same reaction does not take place when an inert material, such as mineral oil, is used in place of the polyhydric alcohol.

My invention will now be more particularly illustrated by means of the following specific examples. All parts are by weight unless otherwise indicated.

*Example 1*

To 150 g. of propylene glycol was added 30 g. of calcium oxide, and 15 g. of powdered sulphur. The reaction mixture was slowly heated in a reaction vessel to a temperature of 140° C. and held at this temperature for 30 minutes. The product was then cooled to 25° C. and filtered. The clear, yellow, oily filtrate contained 8.22% total sulphur. The preparation was stable for months on standing in a bottle at room temperature.

When this preparation is applied to the surface of the skin, the moisture present slowly breaks down the composition with the subsequent liberation of reducing substances, one of which is hydrogen sulphide. The product has been found to be particularly effective in the treatment of mange. Tests have shown that it has no depilatory effects.

*Example 2*

Another soluble sulphur solution in the form of an ointment was prepared as follows:

Two parts of powdered calcium oxide and one part of precipitated sulphur were mixed with ten parts of propylene glycol. The suspension was heated over a boiling water bath until the temperature of the reaction had risen to 115° C. Heating was continued for 2½ to 3 hours with occasional stirring, after which the solution was filtered while hot.

To each 100 parts of the above solution was added 20 parts by volume of a 40% solution of boric acid in propylene glycol to bring the pH to within the range 9.0–9.2. The sulphur solution was then heated to about 80° C. A mixture of 0.1 part of Aerosol OT (dioctyl sodium sulphosuccinate), 2.0 parts of camphor, 0.8 part of menthol, 0.6 part of eucalyptus oil, 10 parts of benzyl alcohol, and 13.5 parts of propylene glycol were mixed and heated to 80° C. 70 parts of Carbowax 4000 (a polyalkylene glycol of high molecular weight) was melted and mixed with 4 parts by weight of triethanolamine at 80° C. The two latter solutions were then added to the sulphur solution and stirred until cool.

The ointment prepared as just described is clear and practically odorless with respect to sulphur. This product can be placed in tubes or jars and kept for an indefinite period of time without decomposition.

While the above examples show that approximately two parts of calcium oxide are used for each part of sulphur, these proportions may vary somewhat over a range of from about one part to three parts of calcium oxide for each part of sulphur. Ordinarily, the reaction product is filtered, and excess or unreacted materials are removed.

The polyhydric alcohol is preferably one of the liquid type such as ethylene glycol, propylene glycol, glycerol, or low polymers thereof. As shown in Example 2, however, higher molecular weight wax-like polyhydric alcohols may be used in whole or in part to modify the fluidity of the final product. Ordinarily, enough polyhydric alcohol is used to yield a product containing from about 2 to 10% of sulphur, although from 2½ to 4½% of sulphur in the final product is preferred. As will also be apparent from Example 2 various other types of modifying agents such as wetting agents, thickeners, buffers, local anesthetics, antiseptics, aromatics, and the like, may be added to the composition if desired. Water should not be present in the reaction mixture inasmuch as it causes decomposition of the product.

For most applications it is desirable that the composition be maintained at a pH of from about 9.0 to 9.8. Ordinarily, after completion of the reaction, particularly when an excess of lime has been used, the reaction product has a pH of about 11 or 12. Careful neutralization with acid makes it possible to lower the pH of the product to within the range desired. Care should be taken in the neutralization to avoid the addition of excess acid, since I have found that too much acid will cause precipitation of the active ingredient of the composition.

As will be apparent from the foregoing, numerous changes may be made in the composition described and claimed herein. Of course, such obvious modifications of my composition as are within the skill of those in the art are intended to be within the scope of the appended claims.

I claim:

1. A composition of matter comprising the reaction product obtained by heating under anhydrous conditions from one to three parts by weight of calcium oxide, one part by weight of sulphur, and a polyhydric alcohol within the range of 100–150° C.

2. A composition of matter comprising the reaction product obtained by heating under anhydrous conditions from one to three parts by weight of calcium oxide, one part by weight of sulphur, and a polyhydric alcohol within the range of 100–150° C., said composition having a pH within the range 9.0–9.8.

3. A composition of matter comprising the reaction product obtained by heating under anhydrous conditions from one to three parts by weight of calcium oxide, one part by weight of sulphur, and propylene glycol at a temperature within the range 100–150° C.

4. A composition of matter comprising the reaction product obtained by heating under anhydrous conditions from one to three parts by weight of calcium oxide, one part by weight of sulphur, and ethylene glycol at a temperature within the range 100–150° C.

5. A composition of matter comprising the reaction product obtained by heating under anhydrous conditions from one to three parts by weight of calcium oxide, one part by weight of sulphur, and glycerol at a temperature within the range 100–150° C.

FRANK E. STIRN.